(12) United States Patent
Fukunaga

(10) Patent No.: US 11,333,466 B2
(45) Date of Patent: May 17, 2022

(54) SYSTEM FOR PROTECTING SHIPS FROM TORPEDOES

(71) Applicant: Mikio Fukunaga, Yokohama (JP)

(72) Inventor: Mikio Fukunaga, Yokohama (JP)

( * ) Notice: Subject to any disclaimer, the term of this patent is extended or adjusted under 35 U.S.C. 154(b) by 0 days.

(21) Appl. No.: 16/953,819

(22) Filed: Nov. 20, 2020

(65) Prior Publication Data

US 2021/0247167 A1 Aug. 12, 2021

(30) Foreign Application Priority Data

Nov. 25, 2019 (JP) .............................. JP2019-211907
Apr. 7, 2020 (JP) .............................. JP2020-069441

(51) Int. Cl.
  *F41H 11/02* (2006.01)
  *F42B 22/24* (2006.01)
  *B63G 13/00* (2006.01)
  *H04B 13/02* (2006.01)

(52) U.S. Cl.
  CPC ............. *F41H 11/02* (2013.01); *B63G 13/00* (2013.01); *F42B 22/24* (2013.01); *H04B 13/02* (2013.01)

(58) Field of Classification Search
  CPC ........... F41H 11/02; F41H 11/05; B63G 9/00; B63G 9/02; B63G 9/04; F42B 22/24
  See application file for complete search history.

(56) References Cited

U.S. PATENT DOCUMENTS

| 1,956,333 | A * | 4/1934 | Olmo ...................... F41H 11/05 |
| | | | 114/241 |
| 9,440,718 | B1 * | 9/2016 | Tang ...................... B64C 39/024 |
| 2019/0061890 | A1 * | 2/2019 | Fiorello ................... B63G 8/22 |

FOREIGN PATENT DOCUMENTS

| KR | 20-0378614 Y1 | 3/2005 |
| KR | 10-1418108 B1 | 7/2014 |

OTHER PUBLICATIONS

Japanese Office Action for corresponding Application No. JP 2020-069441 dated Jul. 14, 2020 with English translation (9 pages).

* cited by examiner

*Primary Examiner* — J. Woodrow Eldred
(74) *Attorney, Agent, or Firm* — Harness, Dickey & Pierce, P.L.C.

(57) ABSTRACT

A means is provided for defending a target from attack by a torpedo with high probability. When a controller detects a torpedo based on an image generated by a sonar, it specifies a path of movement of the torpedo. If there is a water craft or the like within the path of movement, the controller instructs a launcher to launch a torpedo capture device and instructs mines to switch to detonation-off mode. Moveable devices of the torpedo capture device launched by the launcher in accordance with the instruction of the controller move in the water to spread a net. The controller then specifies a location of each of a first moveable device and second moveable devices based on an image generated by the sonar, and instructs the first moveable Device and the second moveable devices to move such that the center of the net is within the path of movement of the torpedo. The first moveable device and the second moveable devices move in accordance with the instruction of the controller. When the torpedo reaches the net, the net captures the torpedo and the mines, which are in the detonation-on mode, explode the torpedo before it reaches the water craft or the like.

12 Claims, 7 Drawing Sheets

SYSTEM FOR PROTECTING SHIPS FROM TORPEDOES

BACKGROUND

Technical Field

This invention relates to a technology for protecting ships from a torpedo.

Background Art

Water craft or the like such as a ship, a water power plant, etc., may become a target of a torpedo attack at a time of conflict. Accordingly, technology has been proposed to provide protection of a target from torpedo attack.

For example, KR20-0378614Y1 discloses a torpedo defense device that consists of a rectangular anti-torpedo net that has plural mines attached to grid points and two moveable units attached to one end each of one side of the net. The moveable units included in the torpedo defense device described in KR20-0378614Y1 are configured to have a floating body, a propulsion unit, and a direction control unit. Under control of an external server device, the moveable units are caused to move when water borne in a direction specified by the directional control unit under a thrust generated by the propulsion unit such that they move the net to a position to capture the path of movement of the torpedo. As a result, the torpedo defense device is able to capture the torpedo with a high probability and destroy it with mine blasts before the torpedo reaches its target.

KR20-0378614Y1 may also be referred to as Patent Document 1.

According to the torpedo defense device disclosed in KR20-0378614Y1, since the net in the water is moved by the waterborne moveable units, a lower part of the net moves more slowly than the moveable units. As a result, a case may arise where the lower part of the net does not move sufficiently quickly, and as a result the torpedo is not able to be effectively captured by the net.

In view of this problem, the present invention provides a means for protecting a target of a torpedo attack with a higher probability as compared with the conventional technology.

SUMMARY

In order to solve the above-described problem, in a first aspect of the present invention, there is proposed a system for protecting water craft or the like from attack by torpedoes, comprising: a net, a plurality of mines attached to the net, and a plurality of moveable devices each of which is attached to the net and is able to move in any direction in water by a thrust generator that generates a water flow to generate thrust and a direction changer that changes a direction each of the moveable devices.

In the system according to the first aspect, since the net is able to be quickly moved in the water, greatly enhanced protection of the target from torpedo attack is attained as compared to conventional technology.

In the system according to the above-described first aspect, as a second aspect, the plurality of moveable devices includes two moveable devices that are positioned at different depths relative to each other when they move in the water.

In the system according to the second aspect, the net can be quickly spread both upward and downward in the water.

In the system according to the above-described second aspect, as a third aspect, a weight in the water of a moveable device that is positioned at a depth shallower than that of the other movable device is lighter than that of the latter, which is positioned at a lower depth.

In the system according to the second aspect, the difference in weight between the moveable devices, which is dependent on their respective depths in the water, allows the net to be quickly spread both upward and downward in the water.

In the system according to the above-described first aspect, as a fourth aspect, each of the plurality of moveable devices has a computer, the computer of each of the plurality of moveable devices functions as a movement direction controller that controls a direction of movement of the moveable device, the computer of each of at least one of the plurality of moveable devices functions as a receiver that receives from an external device a movement instruction signal that indicates a direction of movement, and the movement direction controller of the at least one of the plurality of moveable devices controls a direction of movement of its own moveable device in accordance with the movement instruction signal received by the receiver of its own moveable device.

In the system according to the fourth aspect, since at least one of the moveable devices is capable of receiving from an external device a movement direction instruction signal that instructs the moveable device to move in a direction that blocks the path of movement of the torpedo toward the target, the net can be moved to a position that captures the torpedo.

In the system according to the above-described fourth aspect, as a fifth aspect, the system comprises an external device, wherein the external device has a computer that functions as: a torpedo location specifier that specifies a location of a torpedo based on an image generated by sonar, a movement direction determiner that determines a direction of movement of the at least one of the plurality of moveable devices based on the location of the torpedo specified by the torpedo location specifier, and a transmitter that transmits to the at least one of the plurality of moveable devices a movement instruction signal that indicates the direction of movement determined by the movement direction determiner associated with the moveable device.

In the system according to the fifth aspect, the net can be moved to a position within the path of movement of the torpedo for capture of the torpedo.

In the system according to the above-described fourth aspect, as a sixth aspect, the computer of each of the plurality of moveable devices functions as a movement speed controller, the movement instruction signal indicates a speed f movement in addition to the direction of movement, and the movement speed controller of the at least one of the plurality of moveable devices controls a speed of movement of the movable device in accordance with the movement instruction signal received by the receiver of its own moveable device.

In the system according to the sixth aspect, in contrast to a case where the speed of movement cannot be controlled, the net can be spread more quickly.

In the system according to the above-described fourth aspect, as a seventh aspect, the computer of the at least one of the plurality of moveable devices functions as a transmitter that transmits the movement instruction signal received by the receiver of its own moveable device to any one of the plurality of moveable devices other than its own moveable device.

In the system according to a seventh aspect, not necessarily all of the plurality of moveable devices need receive the movement instruction signal from the external device.

In the system according to the above-described seventh aspect, as an eighth aspect, the transmitter of the at least one of the plurality of moveable devices transmits the movement instruction signal to the destination moveable device via a communication cable.

In the system according to an eighth aspect, transmission of the movement instruction signal can be performed rapidly and reliably.

In the system according to the above-described seventh aspect, as a ninth aspect, the transmitter of the at least one of the plurality of moveable devices transmits the movement instruction signal to the destination moveable device by light or radio waves that propagate through the water.

In the system according to the ninth aspect, there is no need to use wired communication cables.

In the system according to the above-described fourth aspect, as a tenth aspect, the computer of each of the plurality of moveable devices other than the at least one of the plurality of moveable devices functions as: a relative position specifier that specifies a relative position between its own moveable device and each of the plurality of moveable devices other than its own moveable device, and a movement direction determiner that determines a direction of movement based on relative positions specified by the relative position specifier, wherein the movement direction controller of each of the moveable devices other than the at least one of the plurality of moveable devices controls a direction of movement of its own moveable device such that its own moveable device moves in a direction of movement determined by the movement direction determiner of its own moveable device.

In the system according to the tenth aspect, some of the moveable devices move in a direction to spread the net based on relative positions between other of the moveable devices and their own positions, as a result of which the net can be spread quickly In the system according to the above-described first aspect, as an eleventh aspect, the system comprises a case that contains the net, the plurality of mines and the plurality of moveable devices, wherein after the case is ejected into the water, the case opens and releases the net, the plurality of mines and the plurality of moveable devices into the water.

In the system according to the tenth aspect, the mines used to blow up the torpedo can be rapidly moved to a position for destruction of the torpedo.

DETAILED DESCRIPTION

Exemplary Embodiment

Figure 1:
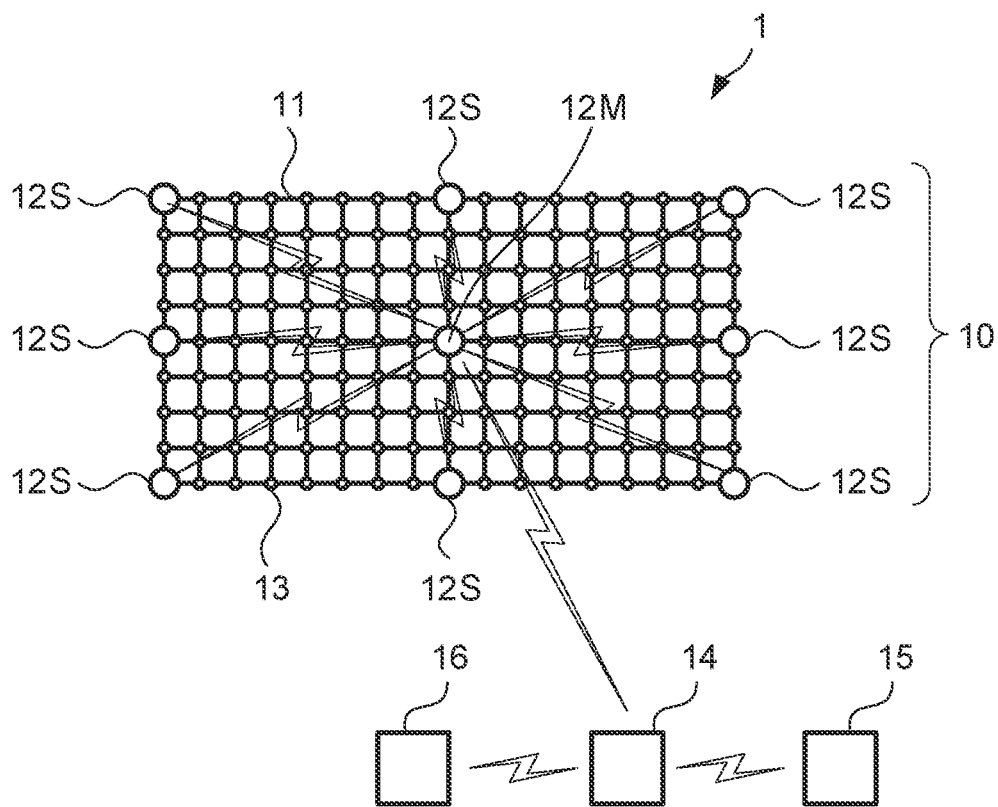
FIG. 1 illustrates an overall configuration of a system for protecting water craft or the like from torpedo attack according to an embodiment of the present invention.

FIG. 1 illustrates an overall configuration of Anti-Torpedo Defense System 1 for protecting water craft or the like, such as a ship, a water power plant, etc., from torpedo attack. Anti-Torpedo Defense System 1 comprises Net 11, Moveable Device 12M attached to the central grid point of Net 11, a plurality of Moveable Devices 12S attached to a number of the off-center grid points of Net 11 (eight Moveable Devices 12S are shown in the example in FIG. 1), a plurality of Mines 13 each of which is attached to one of the grid points of Net 11 to which neither Moveable Device 12M nor Moveable Device 12S is attached, Controller 14, which is located in the water craft or the like, and illustration of which is omitted from FIG. 1, Sonar 15 and Launcher 16.

As explained in the following, when Moveable Device 12M and Moveable Devices 12S are undisguisable from each other, they are collectively referred to as Moveable Device 12.

Net 11 is a net used to capture a torpedo that is on course to attack water craft or the like.

Moveable Device 12 comprises a battery, motors that run under power supplied by the battery, a screw that is rotated by the motors, an up/down rudder and a left/right rudder, angles of which relative to the main body of Moveable Device 12 are changed by the motors. Moveable Device 12 is able to move in any direction in the water.

Moveable Device 12M comprises an optical communication unit for data communication in the water, and receives a movement instruction signal from Controller 14 that indicates a direction of movement and a speed of movement for each of Moveable Devices 12. Controller 14 also comprises an optical communication unit for performing data communication with each of Moveable Devices 12M.

The optical communication unit of Moveable Device 12M of Controller 14 is a unit that emits and receives light, for example at a wavelength of 450 nm, to exchange data with each other in the water. As the optical communication unit of Moveable Device 12M or Controller 14, for example, the underwater optical communication modem BlueComm manufactured by Toyo Corporation (Chuo-ku, Tokyo, Japan), the underwater optical wireless communication unit MC100 manufactured by Shimadzu Corporation (Kyoto, Japan), or the like can be used. The optical communication unit of Controller 14 is mounted outside the hull of a water craft or the like.

Moveable Device 12M and each of Moveable Devices 12S are connected to each other by a communication cable. The communication cable, for example, is attached along lines that make up Net 11. When Moveable Device 12M receives a movement instruction signal for each of Moveable Devices 12 from Controller 14, Moveable Device 12M transmits the movement instruction signal to each of Moveable Devices 12S via the communication cable.

Moveable device 12M moves in a direction of movement and at a speed of movement indicated by the movement instruction signal received directly from Controller 14. Each of Moveable Devices 12S moves in a direction of movement and at a speed of movement indicated by the movement instruction signal received from Controller 14 via Moveable Device 12M.

A weight of each of Moveable Devices 12 is adjusted by a floating body such that a shallower a depth of the device in the water, the lighter the weight of the device is in the water. For example, out of the nine Moveable Devices 12 shown in FIG. 1, the three Moveable Devices 12 in the top row is each lighter than that of an equivalent volume of water and thus when not subject to any external downward force the devices float towards a surface of the water; the weight of the three Moveable Devices 12 in the middle row is each around the same as an equivalent volume of water and thus when not subject to any downward external force the devices float in the water; and the weight of the three Moveable Devices 12 in the bottom row is each heavier than that of an equivalent volume of water, and thus in the absence of any external upward force these devices tend to move downward within the water. Since a weight each of Moveable Devices 12 is adjusted depending on a depth of the device in the water as described above, Moveable Devices 12 are capable of quickly spreading out Net 11 in a vertical direction in the water.

Mines 13 are designed to destroy a torpedo by being detonated when Net 11 captures the torpedo. Each of Mines 13 comprises a computer, an optical communication unit of the same type as that of Controller 14, and an accelerometer. The computer has a memory, a processor that performs data processing upon execution of the program stored in the memory, and an interface that inputs and outputs data to and from external devices under control of the processor. The computer of each of Mines 13 receives a mode switching signal from Controller 14 by way of the optical communication unit. The mode switching signal indicates an instruction to switch an operating mode of Mine 13 between a detonation-off mode and a detonation-on mode. The detonation-off mode is a mode in which detonation is not performed even when the accelerometer measures an acceleration that exceeds a predetermined threshold. The detonation-on mode is a mode in which detonation is performed when the accelerometer measures an acceleration that exceeds the predetermined threshold.

When the computer of Mine 13 receives a mode switching signal from Controller 14 that instructs it to switch from the detonation-off mode to the detonation-on mode, the computer switches its operating mode to the detonation-on mode after elapse of a predetermined period of time (for example, 10 seconds). When the computer of Mine 13 receives a mode switching signal from Controller 14 that instructs it to switch from the detonation-on mode to the detonation-off mode, the computer promptly switches its operating mode to the detonation-off mode.

Hereafter, Net 11, and Moveable Devices 12 and Mines 13 attached to Net 11 are collectively referred to as Torpedo Capture Device 10.

Controller 14 (an example of an external device) detects a torpedo based on images generated by Sonar 15, specifies a path of movement of the torpedo based on changes in position over time of the detected torpedo, and instructs Launcher 16 to launch Torpedo Capture Device 10 at a position that blocks the path of movement of the torpedo if the water craft or the like is within the path of movement of the torpedo. At the same time, Controller 14 transmits a mode switching signal to Mines 13, instructing the mines to switch from the detonation-off mode to the detonation-on mode.

After Torpedo Capture Device 10 is launched by Launcher 16, Controller 14 specifies a position of each of Movable Devices 12 based on images generated by Sonar 15, and determines a direction and speed of movement of each of Movable Devices 12 such that Movable Device 12M is within the path of movement of the torpedo and Movable Devices 12S spread out to their maximum extent around Movable Device 12M.

Sonar 15 emits ultrasonic waves into the water and receives waves reflected therefrom to produce an image of an object in the water. Sonar 15 may be of any appropriate type, such as a searchlight sonar, scanning sonar, and so forth.

Launcher 16 has a launch cylinder for each of Moveable Devices 12, and upon receipt of a launch instruction from Controller 14 simultaneously launches Moveable Devices 12 from the launch cylinders into the water.

Figure 2:
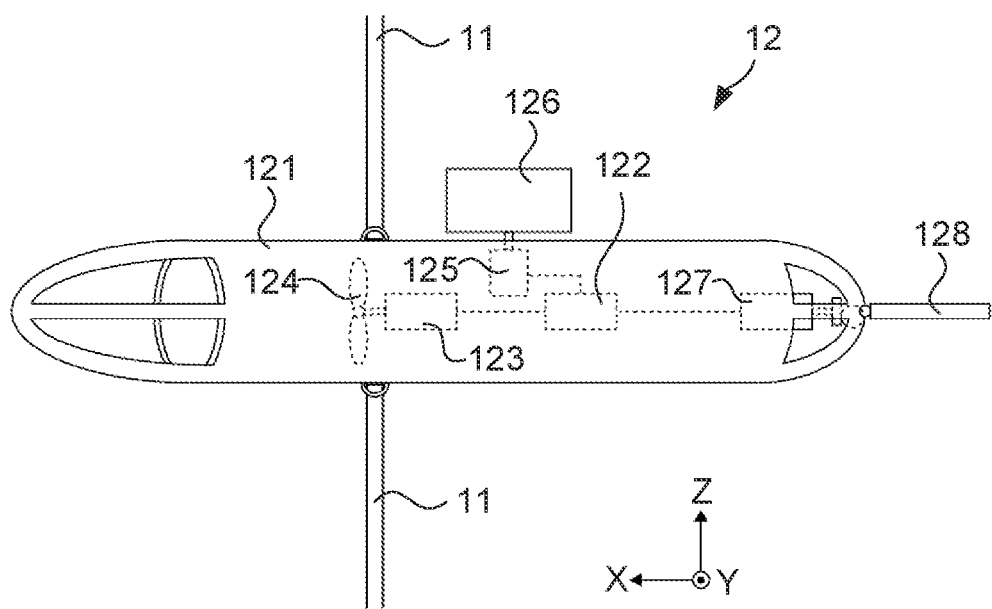
FIG. 2 illustrates a configuration of a moveable device according to an embodiment of the present invention.

FIG. 2 illustrates a configuration of Moveable Device 12. Moveable Device 12 has Case 121 that is generally bullet shaped. Battery 122 is mounted to Case 121, along with Motor 123, which is operated by power supplied from Battery 122. Screw 124 is driven by Motor 123 around the X-axis shown in FIG. 2. Battery 122, Motor 123 and Screw 124 together constitute a thrust generator that generates water flow to generate thrust.

A plurality of openings are provided on both the head side and the tail side of Case 121. When Screw 124 rotates, a flow of water is generated that enters the head side openings of Case 121, passes through Case 121, and exits from the tail side opening of Case 121. The water flow causes Movable Device 12 to move toward the head.

Movable Device 12 comprises Motor 125, which is mounted to Case 121 and is operated by power supplied from Battery 122. Rudder 126 is moved back and forth by Motor 125 within a predetermined angular range around the Z-axis shown in FIG. 2, and effects changes in a left-right direction. Motor 127 is mounted to Case 121, and is operated by power supplied from Battery 122. Rudder 128 is moved back and forth by Motor 127 within a predetermined angular range around the Y-axis shown in FIG. 2, and effects changes in an up-down direction. Movable Device 12 further comprises a computer and communication unit not shown in FIG. 2. Battery 122, Motor 125, Rudder 126 for effecting left-right direction change, Motor 127, and Rudder 128 for effecting up-down direction change together constitute a direction changer that changes a direction of movement of Movable Device 12.

The computer of Movable Device 12 controls operations of other devices of Movable Device 12 (such as Motor 123) by execution of a program to perform data processing. The communication unit of Movable Device 12M is a composite of the optical communication unit described above and a wired communication unit that performs data communication with Movable Devices 12S via communication cables. The communication unit of Movable Device 12S is a wired communication unit that performs data communication with Movable Device 12M via a communication cable.

Figure 3:
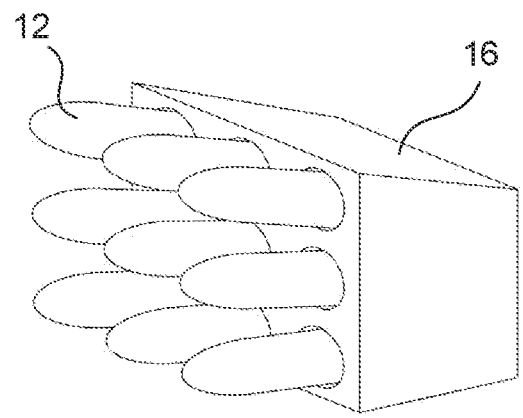
FIG. 3 illustrates an appearance of a launcher according to an embodiment of the present invention.

FIG. 3 illustrates an appearance of Launcher 16. Launcher 16 comprises a computer, a communication unit, a 2-axis platform and hook drive unit (not shown in FIG. 3). When the computer of Launcher 16 receives a launch instruction signal from Controller 14 via the communication unit, it controls the 2-axis platform so that Launcher 16 faces a direction indicated by the launch instruction signal. When the 2-axis platform causes the Launcher 16 to face the direction indicated in the received launch instruction signal, the computer instructs the hook drive unit to release hooks that hold Moveable Devices 12 in the launch cylinders. When the hook drive unit releases the hooks in accordance with the computer's instruction, Moveable Devices 12 are simultaneously launched from the launch cylinders into the water.

An axis of the launch cylinder that launches Moveable Device 12M is in a forward direction of Launcher 16, and each of an axis of the launch cylinders that launch Moveable Device 12S is in a diagonal outward direction. Thus, upon launch from Launcher 16 of each of Moveable Devices 12S, Net 11 is caused to expand while moving outward and away from Moveable Device 12M.

Figure 4A:
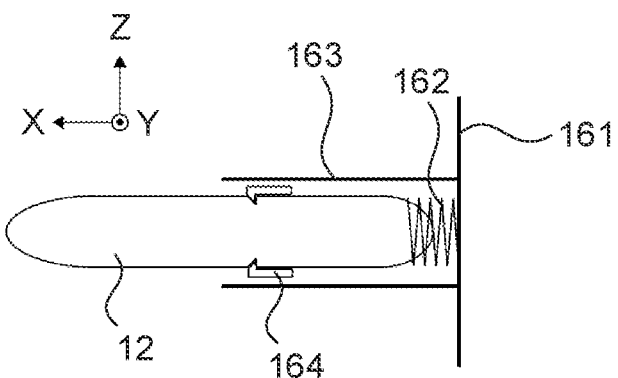
FIG. 4A illustrates a moveable device according to an embodiment of the present invention being launched from a launch cylinder of a launcher.
Figure 4B:
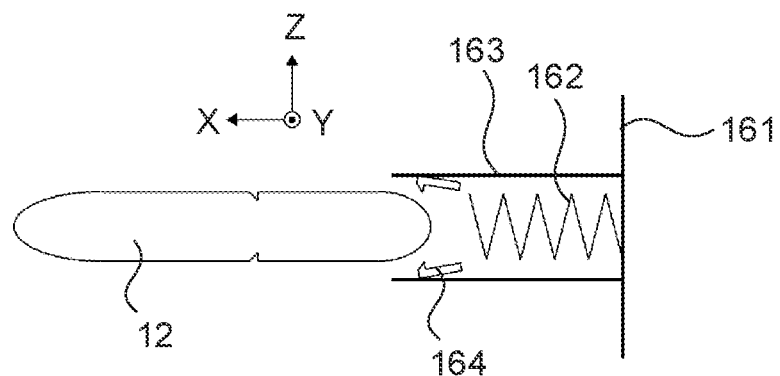
FIG. 4B illustrates a moveable device according to an embodiment of the present invention being launched from a launch cylinder of a launcher.

FIGS. 4A and 4B illustrate how Moveable Devices 12 are launched from the launch cylinders of Launcher 16. As shown in FIG. 4A, Moveable Device 12 ready to be launched is held in Launch Cylinder 163 by Hook 164 attached to Launch Cylinder 163 while Spring 162 attached to Wall 161 of the back side of the enclosure of Launcher 16 applies force to Moveable Device 12 in the positive X-axis direction shown in FIG. 4A.

When Launcher 16 releases Hook 164, Moveable Device 12 is launched from Launch Cylinder 163 in the positive X-axis direction shown in FIG. 4B under the force exerted by Spring 162, as shown in FIG. 4B.

Figure 5A:
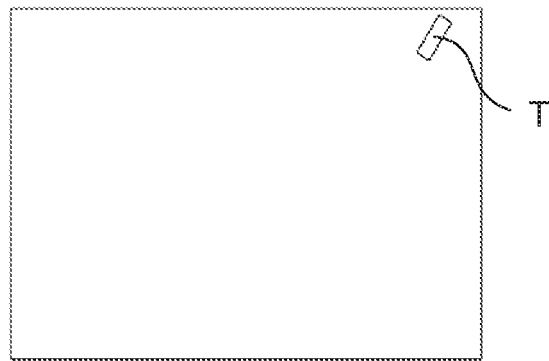
FIG. 5A illustrates how a controller according to an embodiment of the present invention generates a movement instruction signal for each of moveable devices.

FIGS. 5A to 5D illustrate how Controller 14 generates a movement instruction signal for each of 12 Moveable Devices based on images generated by Sonar 15. FIG. 5A is an example of an image that Sonar 15 generates immediately after Torpedo T enters the angle of view of Sonar 15. Controller 14 detects Torpedo T using known image recognition methods based on the image shown in FIG. 5A.

Figure 5B:
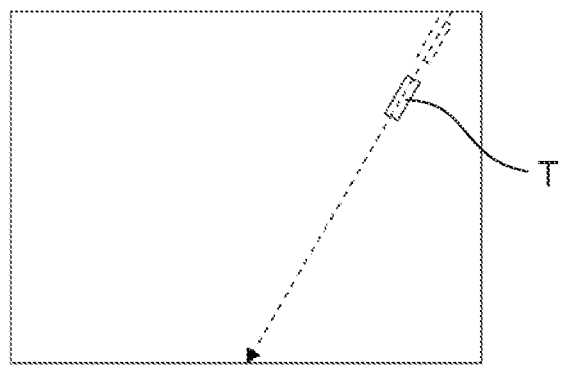
FIG. 5B illustrates how a controller according to an embodiment of the present invention generates a movement instruction signal for each of moveable devices.

FIG. 5B shows an example of image generated by Sonar 15 when a predetermined time (for example, 3 seconds) has elapsed from the timing of the state shown in FIG. 5A. An actual image generated by Sonar 15 is that depicted by a solid line in FIG. 5B. In FIG. 5B, the dashed rectangle indicates a position of Torpedo T in the image shown in FIG. 5A, and the dashed arrow indicates a path of movement of Torpedo T specified based on changes in position of Torpedo T over time as shown in FIG. 5A and FIG. 5B.

When Controller 14 specifies the path of movement of Torpedo T as depicted in FIG. 5B, Controller 14 transmits a launch instruction signal to Launcher 16. In accordance with the launch instruction signal, Launcher 16 changes its position to face the path of movement of Torpedo T, and then launches Movable Devices 12.

Figure 5C:
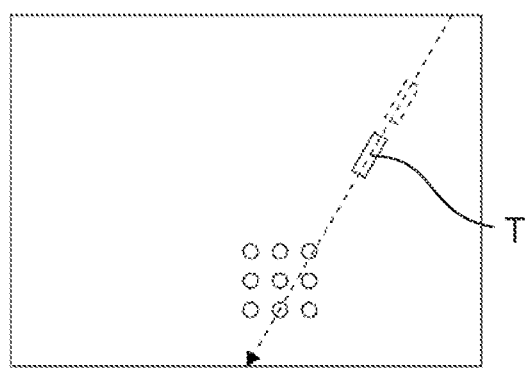
FIG. 5C illustrates how a controller according to an embodiment of the present invention generates a movement instruction signal for each of moveable devices.
Figure 5D:
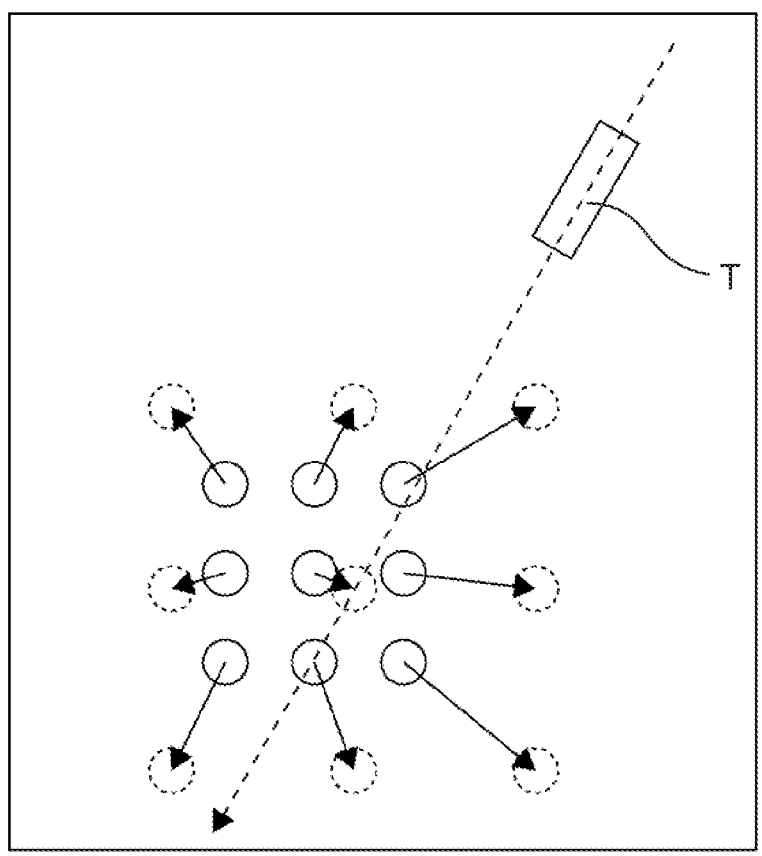
FIG. 5D illustrates how a controller according to an embodiment of the present invention generates a movement instruction signal for each of moveable devices.

FIG. 5C is an example of image generated by Sonar 15 immediately after Movable Devices 12 have been launched. The nine circles shown in FIG. 5C represent Movable Devices 12. FIG. 5D is an enlarged view of the area in FIG. 5C that includes the circles that represent Movable Devices 12. However, an actual image generated by Sonar 15 is indicated by the solid circle and the solid rectangle in FIG. 5D.

In order for Net 11 to capture Torpedo T with high probability, Movable Device 12M should be within the path of movement of Torpedo T, and Movable Devices 12S should be located radially around a point of the path of movement of Torpedo T and spread out to their maximum extent possible subject to the constraints of Net 11. The dashed circle in FIG. 5D shows the location where Moveable Devices 12 should be. The solid arrows in FIG. 5D represent movement vectors that indicate directions in which Moveable Devices 12 should move and speeds at which they should move. Controller 14 specifies these movement vectors, generates a movement instruction signal indicating these movement vectors, and transmits the signal to Moveable Device 12M.

Moveable Device 12M moves in the direction of movement indicated by the part of a received movement instruction signal that relates to itself and at the speed of movement indicated by the part of the received movement instruction signal that relates to itself. Moveable Device 12M transmits to each of Moveable Devices 12S the part of received movement instruction signal that relates to the device. Each of Moveable Devices 12S moves in the direction of movement indicated by the part of the movement instruction signal received from Moveable Device 12M and at the speed of movement indicated by the part of the movement instruction signal received from Moveable Device 12M. As a result, Net 11 is spread out to a maximum extent within the path of movement of Torpedo T, such that Torpedo T is captured in the middle of Net 11.

While Net 11 is being expanded and moved by Moveable Devices 12, the operating mode of Mines 13 is switched to the detonation-on mode. When Torpedo T reaches Net 11, the accelerometer of each of Mines 13 measures an acceleration that exceeds the threshold, and each of Mines 13 detonates. As a result of the detonations of Mines 13, Torpedo T explodes before it reaches the water craft or the like. As a result, damage by the Torpedo T to the water craft or the like is avoided.

Figure 6:
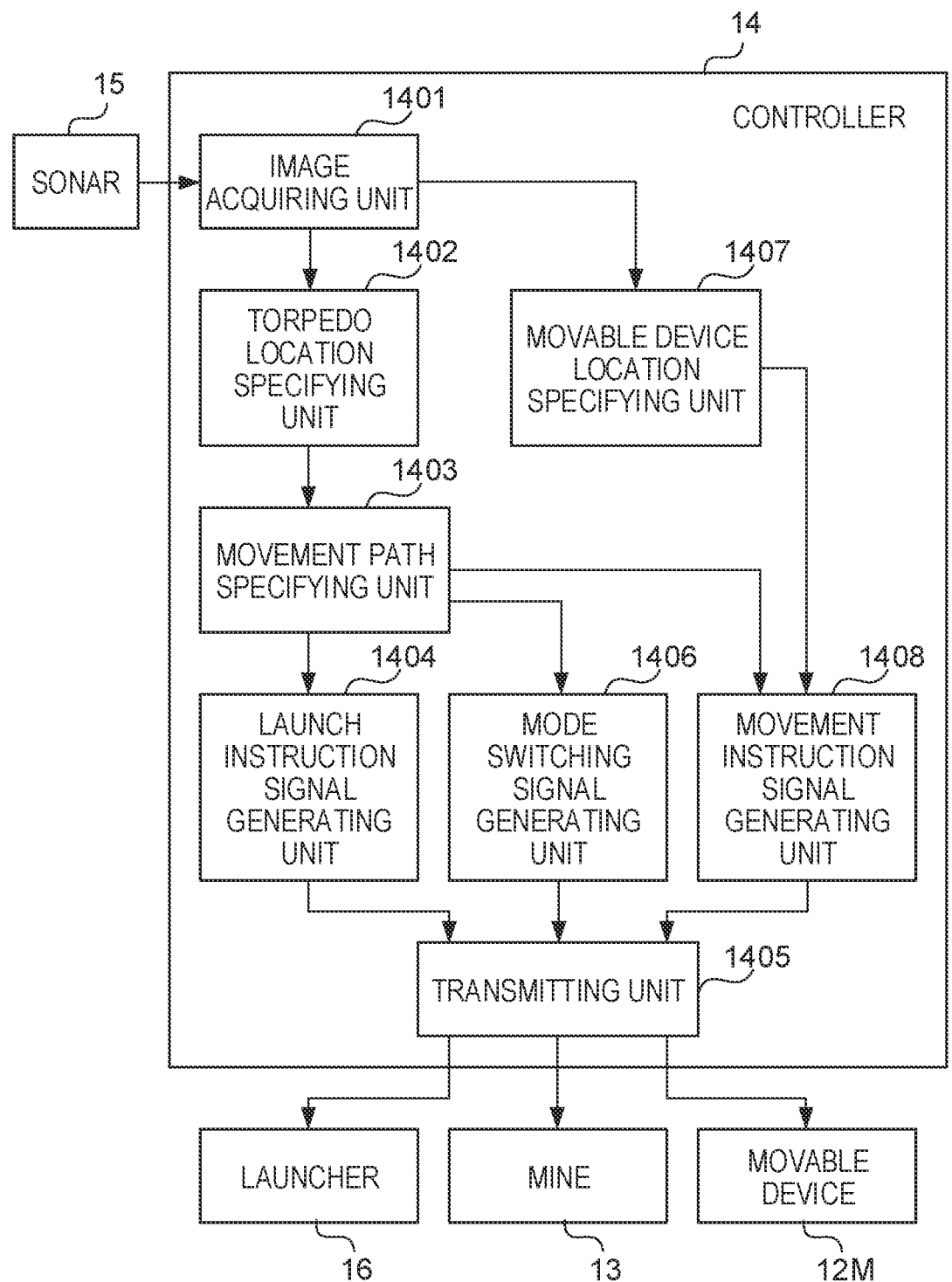
FIG. 6 illustrates a functional configuration of a controller according to an embodiment of the present invention.

FIG. 6 illustrates a functional configuration of Controller 14. When the computer of Controller 14 performs data processing in accordance with an executed program, it functions as a device having the components shown in FIG. 6. Each of the components of the functional configuration of Controller 14 is described below.

Image Acquiring Unit 1401 acquires an image from Sonar 15. Torpedo Location Specifying Unit 1402 specifies a location of torpedo based on an image acquired by Image Acquiring Unit 1401. Movement Path Specifying Unit 1403 specifies a path of movement of the torpedo based on change over time of a location of the torpedo specified by Torpedo Location Specifying Unit 1402. Launch Instruction Signal Generating Unit 1404 generates a launch instruction signal based on the path of movement of the torpedo specified by Movement Path Specifying Unit 1403, if the ship is within the path of movement. Transmission Unit 1405 transmits to Launcher 16 the launch instruction signal generated by Launch Instruction Signal Generating Unit 1404.

Mode Switching Signal Generating Unit 1406 generates a mode switching signal that instructs Mines 13 to switch from the detonation-off mode to the detonation-on mode when the water craft or the like is within the path of movement of the torpedo specified by Movement Path Specifying Unit 1403. The mode switching signal generated by Mode Switching Signal Generating Unit 1406 is transmitted to each of Mines 13 by Transmitting Unit 1405.

Movable Device Location Specifying Unit 1407 specifies locations of each of Moveable Devices 12 based on an image acquired by Image Acquiring Unit 1401. Movement Instruction Signal Generating Unit 1408 (an example of a movement direction determiner) determines a direction and speed of movement of each of Moveable Devices 12 based on the path of movement of the torpedo specified by Movement Path Specifying Unit 1403 and the location of each of Moveable Devices 12 specified by Movable Device Location Specifying Unit 1407, and generates a movement instruction signal indicating the specified direction and speed of movement of each of Moveable Devices 12. The movement instruction signal generated by Movement Instruction Signal Generating Unit 1408 is transmitted to Moveable Device 12M by Transmitting Unit 1405.

Figure 7:
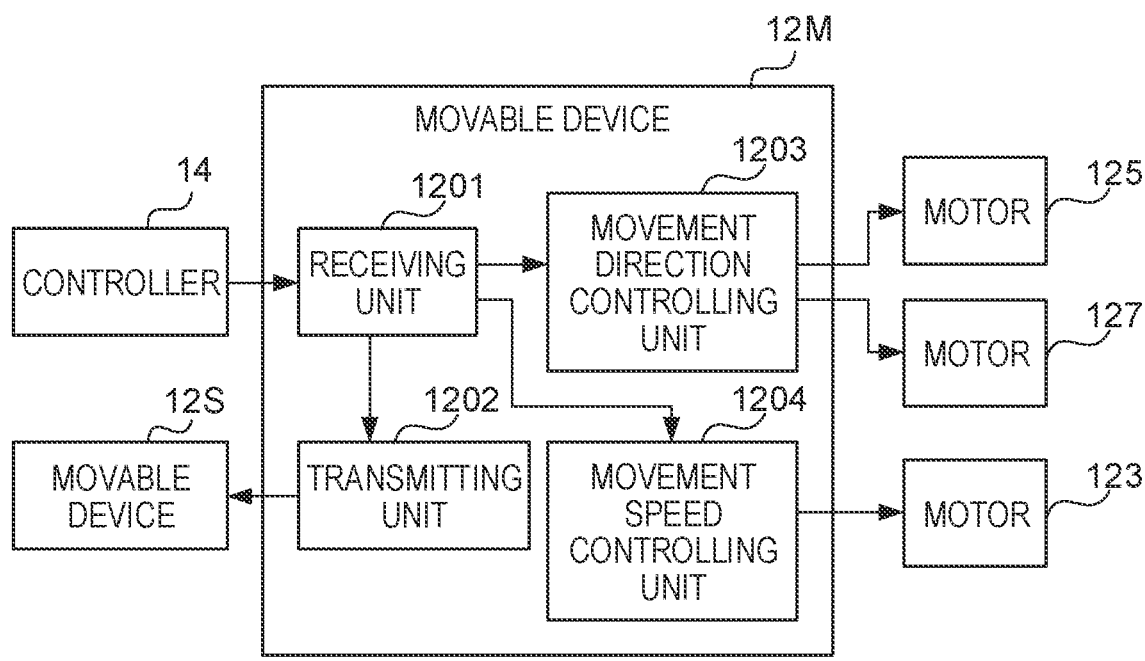
FIG. 7 illustrates a functional configuration of a moveable device according to an embodiment of the present invention.

FIG. 7 illustrates a functional configuration of Moveable Device 12M. When the computer of Moveable Device 12M performs data processing in accordance with an executed program, it functions as a device with the components shown in FIG. 7. Each of the components of the functional configuration of Moveable Device 12M is described below.

Receiving Unit 1201 receives a movement instruction signal from Controller 14. Transmitting Unit 1202 transmits to each of Moveable Devices 12S a part of the received movement instruction signal that relates to the device.

Movement Direction Controlling Unit 1203 controls a direction of movement of Moveable Device 12M by controlling Motor 125 and Motor 127 to change angles of Rudder 126 and Rudder 128 so that Moveable Device 12M moves in the direction of movement indicated by the movement instruction signal received by Receiving Unit 1201. Movement Speed Controlling Unit 1204 controls a speed of Moveable Device 12M by controlling Motor 123 to change a rotation speed of Screw 124 so that Moveable Device 12M moves at the speed of movement indicated by the movement instruction signal received by Receiving Unit 1201.

A functional configuration of each of Moveable Devices 12S is the same as that of Moveable Device 12M described above, with the exception of the following points:
(a) Receiving Unit 1201 of Moveable Device 12S receives a movement instruction signal from Moveable Device 12M that relates to its own device, and
(b) Moveable Device 12S does not have Transmitting Unit 1202.

According to Anti-Torpedo Defense System 1 described above, a target of attack of a torpedo can be protected from the attack with high probability.

Modifications

The embodiment described above can be variously modified within the scope of the present invention. Examples of such modifications are given below. Two or more of the following modifications may be combined.
(1) In the embodiment described above, the number of Moveable Devices 12M is one, but the number of Moveable Devices 12M may be two or more. For example, Moveable Device 12 in the middle of the left-right direction in the upper row and Moveable Device 12 in the middle of the left-right direction in the lower row may be Moveable Devices 12M, and each of Moveable Devices 12M may transmit the movement instruction signals received from Controller 14 to Moveable Device 12S in a row corresponding to its own device.
(2) In the embodiment described above, a movement instruction signal transmitted from Controller 14 is received by Moveable Device 12M, and each of Moveable Devices 12S receives from Moveable Device 12M a part of the movement instruction signal that relates to its own device. Alternatively, each of Moveable Devices 12S may have an optical communication unit, and may directly receive from Controller 14 a movement instruction signal that relates to its own device.
(3) In the embodiment described above, data communication between Controller 14 and Moveable Device 12M is performed by use of light. Alternatively, data communication between Controller 14 and Moveable Device 12M may be performed by use of radio waves. As for the technology used to communicate data by radio waves in the water, for example, there are products named Seatooth and SeaText developed by Wireless Fiber Systems Ltd (United Kingdom).
(4) In the embodiment described above, data communication between Moveable Device 12M and each of Moveable Devices 12S is performed via a communication cable. Alternatively, communication between Moveable Device 12M and each of Moveable Devices 12S may be performed by use of light or radio waves.
(5) Each of Moveable Devices 12S may comprise a relative position specifying unit that specifies relative positions between its own device and other of Moveable Devices 12, and a movement direction determining unit that determines a direction of movement of its own device based on the relative positions specified by the relative position specifying unit. In this modified embodiment, Movement Direction Controlling Unit 1203 of Moveable Device 12S controls a direction of movement of its own device so that it moves in the direction of movement determined by the movement direction determining unit.

For example, each of Moveable Device 12M and Moveable Devices 12S in this modified embodiment has a transmitting antenna that transmits radio waves. Each of Moveable Devices 12S in this modified embodiment has three receiving antennas each for reception of radio waves transmitted from the transmitting antennas of Moveable Devices 12 other than itself. device. Then, the relative position identifying unit of each of Moveable Devices 12S specifies a relative position between its own device and each of Moveable Devices 12 other than itself based on phase differences in radio waves received by the three receiving antennas. Each of Moveable Devices 12S may transmit radio waves only in time slots that are allocated to its own device, since radio interference may occur if two or more Moveable Devices 12S transmit radio waves at the same time.

The movement direction determining unit of each of Moveable Devices 12S in this modified embodiment determines a direction of movement of its own device so that the relative position of its own device with that of neighboring Moveable Devices 12S becomes closer to the relative position when Net 11 is expanded to the maximum extent. As a result, each of Moveable Devices 12S starts to move in the direction of expansion of Net 11 before receiving a movement instruction signal from Controller 14 via Moveable Device 12M. As a result, Net 11 is able to spread more quickly.

The method by which each of Moveable Devices 12S specifies a relative position of its own device with other Moveable Devices 12 is not limited to the method described above. For example, a distance meter that measures a distance between its own device and a target object using light may be used to specify the relative position.

(6) Not all grid points in Net 11 need to be equipped with Moveable Devices 12 or Mines 13. Locations in Net 11 where Moveable Devices 12 and Mines 13 are attached are not limited to the grid points of Net 11. The size and shape of Net 11 are not limited to those shown in FIG. 1. The numbers of Mines 13 and Moveable Devices 12 are not limited to those shown in FIG. 1. The configuration of Moveable Device 12 shown in FIG. 2 and the configuration of Launcher 16 shown in FIGS. 3 and 4 are examples, and various other configurations may be employed. For example, the configuration in which Launcher 16 launches Moveable Devices 12 is not limited to the configuration in which a spring force is utilized. For example, a configuration in which Moveable Devices 12 are launched by compressed air may be employed.

(7) After Torpedo Capture Device 10 is launched into the water, if Net 11 does not capture the torpedo for a reason, for example, that the torpedo changes its direction of movement and Mines 13 do not explode, Controller 14 may transmit a mode switching signal to each of Mines 13 to instruct them to switch from the detonation-on mode to the detonation-off mode. In this case, each of Mines 13 switches to the detonation-off mode in accordance with the mode switching signal transmitted from Controller 14, and thus the mines do not explode even if subject to a shock of some kind.

(8) The underwater weight of each of Mines 13 may be adjusted such that the shallower a depth when Net 11 spreads out in the water is, the lighter its weight is. For example, in the example of FIG. 1, if an underwater weight of Mine 13 in the n-th row from the top row is Wn (where n is one of natural numbers from 1 to 9), underwater weights of Mines 13 may be adjusted so that W1<W2<W3<W4<W5<W6<W7<W8<W9. According to this modified embodiment, Net 11 spreads quickly in the vertical direction.

(9) In the embodiment described above, each of Moveable Devices 12 is launched separately from Launcher 16. Alternatively, Torpedo Capture Device 10 which includes Moveable Devices 12 may be housed in a bullet-shaped case, and a launcher may launch the case containing Torpedo Capture Device 10.

Figure 8:
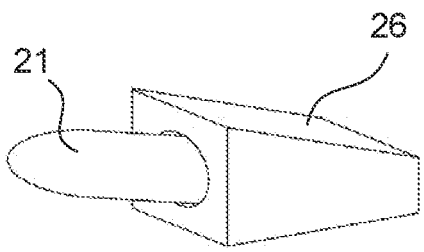
FIG. 8 illustrates appearances of a launcher and a case loaded into the launcher according to a modified embodiment of the present invention.

FIG. 8 illustrates appearances of Launcher 26 and Case 21 loaded in a launch cylinder of Launcher 26.

Launcher 26 launches Case 21 containing Torpedo Capture Device 10 into the water under a force exerted, for example, by a spring or compressed air.

Figure 9:
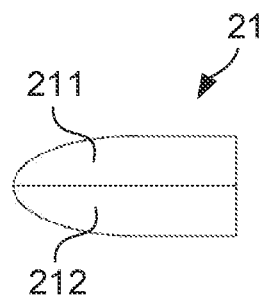
FIG. 9 illustrates an appearance of a case according to a modified embodiment of the present invention.

FIG. 9 illustrates an appearance of Case 21. An overall shape of Case 21 is bullet shape. Case 21 comprises First Part 211 and Second Part 212 which are separable from each other.

Figure 10:
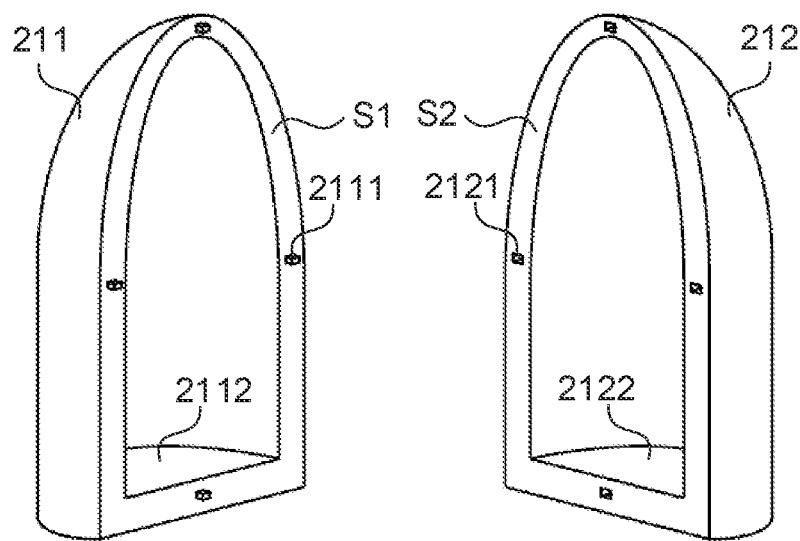
FIG. 10 illustrates appearances of first and second parts of a case according to a modified embodiment of the present invention.

FIG. 10 illustrates appearances of First Part 211 and Second Part 212. Each of First Part 211 and Second Part 212 has a shape of a bullet divided in two lengthwise, with an internal space for housing the Torpedo Capture Device 10.

Convex Portions 2111 are provided on Surface S1 which is the surface where First Part 211 contacts Second Part 212, and Concave Portions 2121 are provided on Surface S2 which is the surface where Second Part 212 contacts First Part 211. When First Part 211 and Second Part 212 are connected, Convex Portions 2111 are inserted into Concave Portions 2121 to position First Part 211 and Second Part 212.

Base 2112 of First Part 211 houses a battery and an electromagnet. The electromagnet housed in Base 2112 generates a magnetic force under power supplied from the battery and magnetizes the magnetic material (for example, iron) located on Surface S1 of First Part 211 to S-pole.

Base 2122 of Second Part 212 houses a battery, an electromagnet, an accelerometer, a timer and a switch. The electromagnet housed in Base 212 generates a magnetic force under power supplied from the battery and magnetizes the magnetic material (for example, iron) located on Surface S2 of Second Part 212 to N-pole or S-pole.

When the accelerometer detects an acceleration that exceeds a predetermined threshold that occurs when Case 21 is launched from Launcher 26, it outputs a signal to the timer. The timer measures an elapsed time from the time when the signal is received from the accelerometer, and outputs a signal to the switch when a predetermined time (for example, 5 seconds) has elapsed. The switch switches a polarity of the magnetic force generated by the electromagnet when it receives the signal from the timer.

The electromagnet housed in Base 212 of Second Part 212 continues to magnetize the magnetic material located on Surface S2 to N-pole while Case 21 is loaded in Launcher 26. Therefore, attraction between Surface S1 of First Part 211 and Surface S2 of Second Part 212 is maintained and First Part 211 and Second Part 212 are connected to each other by magnetic force.

When a predetermined time has elapsed after Case 21 is launched from Launcher 26, the switch housed in Base 212 of Second Part 212 switches the polarity of magnetic force generated by the electromagnet, and the magnetic material located on Surface S2 is magnetized to S-pole. As a result, Surface S1 of First Part 211 and Surface S2 of Second Part 212 repel each other by magnetic force, and First Part 211 and Second Part 212 are separated from each other.

Figure 11:
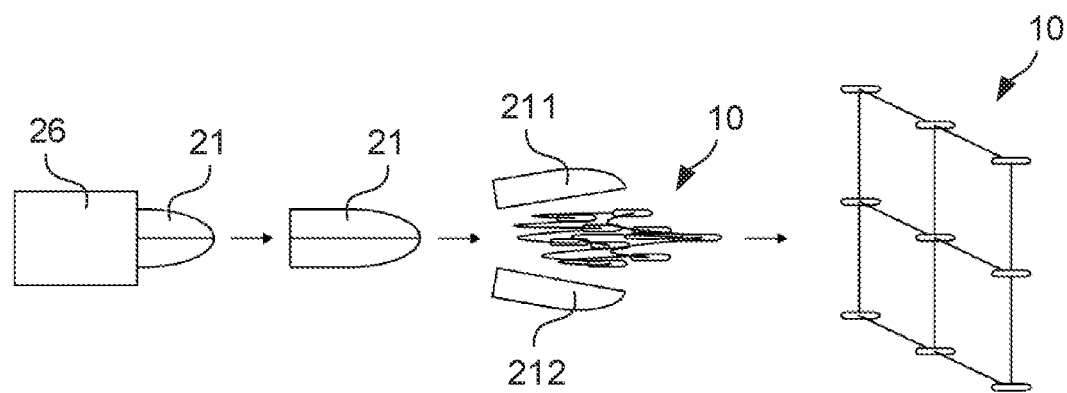
FIG. 11 illustrates how a case according to a modified embodiment of the present invention releases a torpedo capture device into the water after it is launched.

FIG. 11 illustrates how Case 21 is launched from Launcher 26 and Torpedo Capture Device 10 housed in Case 21 is unleashed into the water. In FIG. 11, some parts of Line 11 are omitted. When a predetermined time has passed after Case 21 is launched from Launcher 26, First Part 211 and Second Part 212 separate, and Torpedo Capture Device 10 housed in Case 21 is released into the water. Once released into the water, Torpedo Capture Device 10 expands in the water and prepares to capture the torpedo.

In this modified embodiment, the connection and uncoupling of First Part 211 and Second Part 212 may be achieved by use of a method other than one that employs magnetic force. For example, an electric actuator may be used to connect and uncouple First Part 211 and Second Part 212. The number of parts that make up Case 21 is not limited to two. For example, Case 21 may consist of three or more parts, and these parts may be separated after launch.

According to this modified embodiment, mines for exploding a torpedo can be moved quickly into position for capturing the torpedo.

The invention claimed is:

1. A system for protecting water craft from attack by torpedoes, comprising:
   a net;
   a plurality of mines attached to the net; and
   a plurality of moveable devices each of which is attached to a submerged position of the net when the net is submerged and spread out in water,
   each of the moveable devices being configured to move in any direction while submerged in the water by including:
   a thrust generator that generates a water flow to generate thrust; and a direction changer that changes a direction of the moveable device.

2. The system according to claim 1, wherein
the plurality of moveable devices includes two moveable devices that are positioned at different depths relative to each other when the two moveable devices move in the water.

3. The system according to claim 2, wherein
a first of the two moveable devices is positioned at a first depth in the water and has a first weight,
a second of the two moveable devices is positioned at a second depth in the water and has a second weight,
the first depth is shallower than the second depth, and
the first weight is lighter than the second weight.

4. The system according to claim 1, wherein
each of the plurality of moveable devices has a computer,
the computer of each of the plurality of moveable devices functions as a movement direction controller that controls a direction of movement of the moveable device,
the computer of each of at least one of the plurality of moveable devices is configured as a receiver that receives from an external device a movement instruction signal that indicates a direction of movement, and
the movement direction controller of the at least one of the plurality of moveable devices controls a direction of movement of its own moveable device in accordance with the movement instruction signal received by the receiver of its own moveable device.

5. The system according to claim 4, further comprising an external device, wherein
the external device has a computer that functions as:
a torpedo location specifier configured to specify a location of a torpedo based on an image generated by sonar;
a movement direction determiner configured to determine a direction of movement of the at least one of the plurality of moveable devices based on the location of the torpedo specified by the torpedo location specifier, and
a transmitter configured to transmit to the at least one of the plurality of moveable devices a movement instruction signal that indicates the direction of movement determined by the movement direction determiner associated with the moveable device.

6. The system according to claim 4, wherein
the computer of each of the plurality of moveable devices is configured as a movement speed controller,
the movement instruction signal indicates a speed of movement in addition to the direction of movement, and
the movement speed controller of the at least one of the plurality of moveable devices controls a speed of movement of the movable device in accordance with the movement instruction signal received by the receiver of its own moveable device.

7. The system according to claim 4, wherein
the computer of the at least one of the plurality of moveable devices is configured as a transmitter that transmits the movement instruction signal received by the receiver of its own moveable device to any one of the plurality of moveable devices other than its own moveable device.

8. The system according to claim 7, wherein
the transmitter of the at least one of the plurality of moveable devices transmits the movement instruction signal to the destination moveable device via a communication cable.

9. The system according to claim 7, wherein
the transmitter of the at least one of the plurality of moveable devices transmits the movement instruction signal to the destination moveable device by light that propagates through the water.

10. The system according to claim 4, wherein
the computer of each of the plurality of moveable devices other than the at least one of the plurality of moveable devices is configured as:
a relative position specifier that specifies a relative position between its own moveable device and each of the plurality of moveable devices other than its own moveable device; and
a movement direction determiner that determines a direction of movement based on relative positions specified by the relative position specifier;
wherein the movement direction controller of each of the moveable devices other than the at least one of the plurality of moveable devices controls a direction of movement of its own moveable device such that its own moveable device moves in a direction of movement determined by the movement direction determiner of its own moveable device.

11. The system according to claim 1, comprising:
a case that contains the net, the plurality of mines and the plurality of moveable devices,
wherein, after the case is ejected into the water, the case opens and releases the net, the plurality of mines and the plurality of moveable devices into the water.

12. The system according to claim 7, wherein
the transmitter of the at least one of the plurality of moveable devices transmits the movement instruction signal to the destination moveable device by radio waves that propagate through the water.

* * * * *